United States Patent [19]
Bernard

[11] Patent Number: 5,311,308
[45] Date of Patent: May 10, 1994

[54] METHOD AND DEVICE FOR ENCODING-DECODING A NARROW BAND HIGH DEFINITION DIGITAL TELEVISION SIGNAL

[75] Inventor: Philippe Bernard, Cesson Sevigne, France

[73] Assignees: French State, represented by the Minister of Post, Telecommunications and Space (Centre National D'Etudes des Telecommunications); Telediffusion de France, both of France

[21] Appl. No.: 672,167

[22] Filed: Mar. 19, 1991

[30] Foreign Application Priority Data

Mar. 20, 1990 [FR] France ................... 9003550

[51] Int. Cl.$^5$ ................................ H04N 7/12
[52] U.S. Cl. ........................ 348/426; 348/384
[58] Field of Search ............ 358/133, 166, 138, 12

[56] References Cited

U.S. PATENT DOCUMENTS

| | | | |
|---|---|---|---|
| 4,661,862 | 4/1987 | Thompson | 358/335 |
| 4,730,215 | 3/1988 | Jose et al. | 358/140 |
| 4,974,064 | 11/1990 | Tsinberg | 358/1 R |

FOREIGN PATENT DOCUMENTS

0352963  1/1990  European Pat. Off. .
2070382  9/1981  United Kingdom ............... 358/138

*Primary Examiner*—Alvin E. Oberley
*Assistant Examiner*—Minsun Oh
*Attorney, Agent, or Firm*—Larson and Taylor

[57] ABSTRACT

A method and device are provided for encoding-decoding an HD digital television signal into a narrow band encoded signal. The HD digital television signal is representative of high definition images sampled at a frequency f1, and the narrow band encoded signal corresponds to a narrow band signal sampled at f2, wherein f2<f1. Narrow band encoding is achieved by horizontal compression by decimation of the image lines of the HD digital television signal so as to bring the number N1 of useful pixels per image line to a value N2=α of the sampling frequencies, so as to thus form an encoded signal representative of an image line and obtain reduced format high definition images. A narrow band encoded signal representative of digital television signals can thus be broadcast over an HD-MAC NB type channel.

8 Claims, 6 Drawing Sheets

METHOD AND DEVICE FOR ENCODING-DECODING A NARROW BAND HIGH DEFINITION DIGITAL TELEVISION SIGNAL

The present invention relates to a method for encoding and decoding a high definition digital television signal into a narrow band coded signal on an HD-MAC type channel and to the corresponding encoding and decoding device.

At the present time, the standards or protocols for transmitting television signals are in full development, and in particular because of the institution in a near future of one more transmitting standards for high definition television, TV.HD.

Within the scope of the EUREKA 95 project, the European partners have already established the essential characteristics of a TV.HD television broadcasting system, by means of an HD-MAC type channel.

Figure 1A:
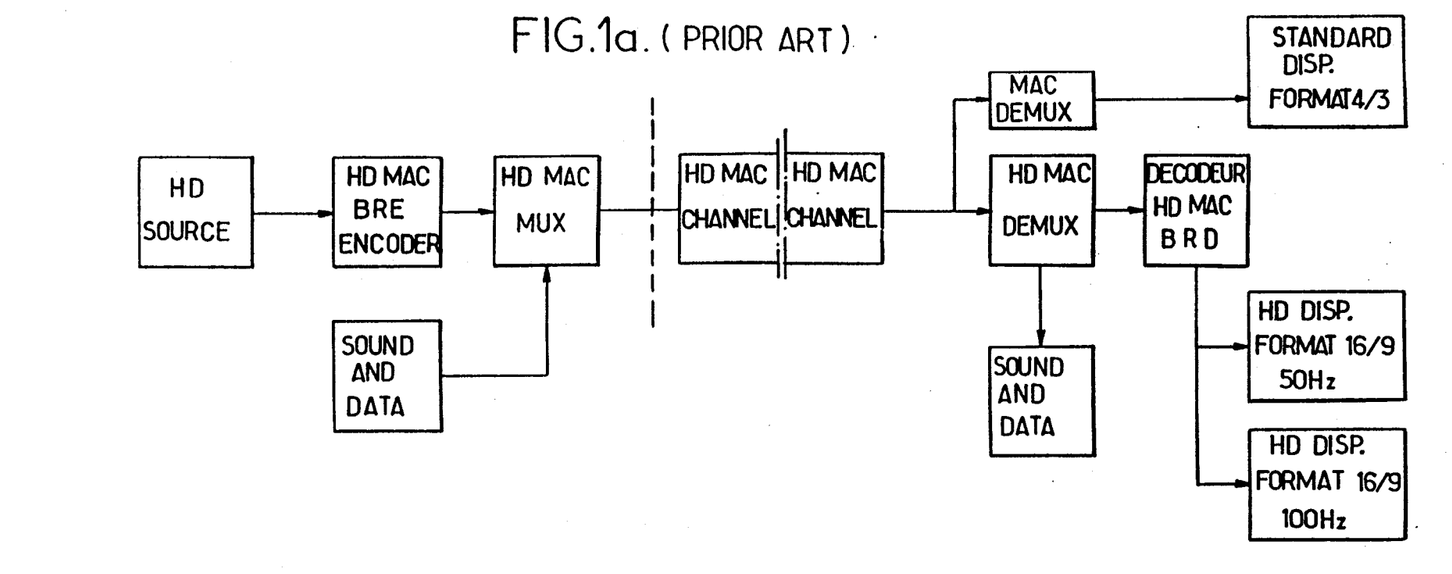

Such a system as is shown in FIG. 1a comprises from a high definition source, HD source, an HD-MAC encoder (band reduction encoder) for reducing the band width of the video data signals for transmitting same over the HD-MAC type channel. A multiplexer MUX HD-MAC provides time multiplexing to the HD-MAC standard, which is then transmitted by the HD-MAC type channel via a satellite link.

At reception a demultiplexer HD-MAC DEMUX restores both the sound and TV assistance data and, via an HD-MAC decoder (band restitution decoder), restores the initial band width, so the HD image. The HD images may be restored either at the image frequency of 50 Hz or at a double image frequency, so as to overcome the flicker phenomenon visible in HD images.

For a more complete description of such HD-MAC systems, reference may be made to the articles published by Marie Jean COLAITIS (Le système HD-MAC Principes et aspects en bande de base" and Jacques VEILLARD "Le système HD-MAC aspects radioelectriques", published in the review Onde Electrique July–August 1989, vol 69 no. 4, pages 13 to 19 and pages 20 to 25 respectively.

Figure 1B:
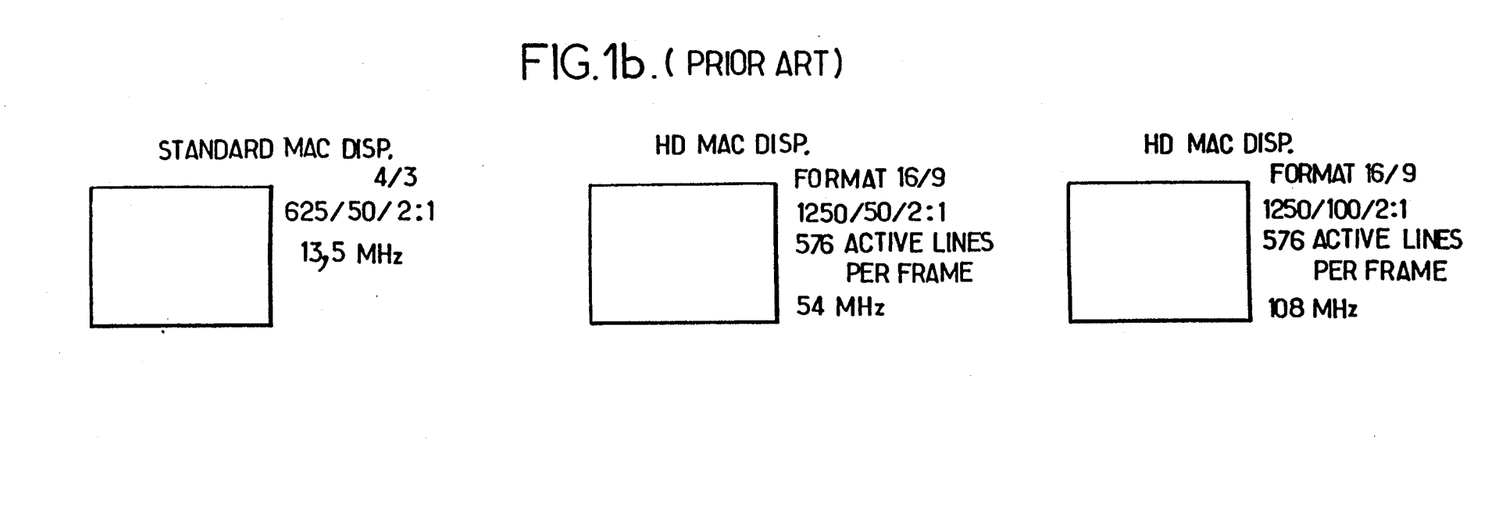

In so far as the formats are concerned for displaying the images, as shown in FIG. 1b, it will be recalled than an HD-MAC type channel makes it possible, for an image analysis by the HD source over two interlaced analysis frames, to restore images to the 16/9 format at 1250 useful lines, over two 2:1 interlaced frames, at an image frequency of 50 Hz or 100 Hz. Each line comprises 1440 pixels and each frame comprises 576 active lines, and the luminance and chrominance video components correspond to a base frequency of the encoder BRE and of the decoder BRD of HD-MAC type, equal to 54 MHz.

It will be further noted, as is shown in FIG. 1a, that the use of a MAC demultiplexer of D2MAC type, after demodulation of the signal transmitted by the HD-MAC channel, from a base band signal of width 10.125 MHz allows a MAC standard display image to be obtained to the 4/4 format comprising 625 image lines, over two 2:1 interlaced frames at an image frequency of 50 Hz.

In so far as the DATV assistance data is concerned, it is transmitted over the HD-MAC channel with duo-binary encoding at a frequency of 20.25 MHz, i.e. with a bit rate of 1.1 bits/s during the twenty four frame suppression lines.

At the present time, the HD image signals to the 16/9 format cannot be broadcast over the ground network whether by the wired network or the short-wave link network. These networks may at most allow images to be broadcast to the 4/3 format in PAL or SECAM quality, the base band frequency band width transmissible by these networks being limited to 6.75 MHz.

The present invention has as object a method and device for encoding-decoding an HD digital television signal permitting broadcasting of HD images to the 16/9 format over an HD-MAC type channel and transmission thereof over the ground distribution network such as wired networks or short-wave link networks.

For this, the encoding-decoding device according to the invention allows HD digital television signals to be transmitted in a narrow band over an HD-MAC type channel, referenced HD-MAC NB, the narrow band transmission being achieved by folding up the base band frequency spectrum so as to bring the band width of the base band signal from 13.50 MHz to 9 MHz.

Another object of the present invention is also to provide compatibility of the HD-MAC NB narrow band encoded signals with the pre-existing equipment of the HD-MAC channel, band reducer BRE, and the HD-MAC band restitution decoder, BRD.

Another object of the present invention is also the provision of a method and device for narrow band encoding-decoding of an HD digital television signal, ensuring compatibility with the HD image production standards such as defined by the CCIR (Comite Consultative International des Radio Communications), on the basis of the analysis standards:

HDP (high definition progressive) line scanning over a single frame, the sampling frequency being equal to 144 MHz, HDQ (high definition quinconce) at a sampling frequency equal to 72 MHz, HDI (high definition interlace) at a sampling frequency equal to 72 MHz.

It will be noted that, for the three above image analysis standards, the image sampling frequencies are brought, by sub sampling, to the base frequency of the HD band reduction encoder BRE, namely to 54 MHz, this sub sampling operation being for example carried out at the level of the A-D converter equipping the HD source.

Another object of the present invention is to provide a method and device for encoding-decoding a narrow band coded digital television signal compatible with the progressive analysis scanning production standards at 625 lines per image in a 16/9 image display format in which the signals correspond to a sampling frequency equal to 36 MHz.

The method of encoding a HD digital television signal into a narrow band encoded signal, for broadcasting this digital signal over an HD-MAC type channel, this digital television signal being representative of high definition images sampled at a frequency f1 and the encoded signal corresponding to a narrow band signal sampled at a sampling frequency f2, for broadcasting same in HD-MAC NB narrow band, f2 being less than f1, is remarkable in that it consists in providing horizontal compression, by decimation, of the high definition images, so as to bring the number N1 of useful pixels per line of the high definition image to a value $N2 = \alpha N1$, after compression, in the ratio of the sampling frequencies:

$$\alpha = \frac{f2}{f1}$$

The narrow band encoded signal is thus representative of an image line and reduced format high definition images.

The method of decoding an HD digital television signal encoded in a narrow band encoded signal HD-MAC NB, according to the encoding method of the invention, is remarkable in that it comprises, at reception, a step for horizontal image line decompression.

The device for encoding an HD digital television signal into a narrow band encoded signal, for broadcasting this digital signal over an HD-MAC type channel, in accordance with the present invention, this digital television signal being representative of high definition images sampled at a frequency f1 and the encoded signal corresponding to a signal sampled at a frequency f2, for broadcasting same in HD-MAC NB narrow band, is remarkable in that it comprises means for horizontal compression, by decimation, of the high definition images, so as to bring the number N1 of useful pixels per line of the high definition image to a value N2=αN1, after compression, in the ratio of the sampling frequencies:

$$\alpha = \frac{f2}{f1}$$

The narrow band encoded signal is thus representative of an image line and reduced format high definition images.

The device for decoding a narrow band encoded digital television signal broadcast over an HD-MAC channel, in accordance with the present invention, this digital television signal being representative of high definition images sampled at a frequency f1 and the narrow band encoded signal corresponding to a signal sampled at a sampling frequency f2, f2 being less than f1, is remarkable in that it comprises means for restoring the image format by horizontal image line decompression.

The method and device for encoding-decoding a narrow band encoded HD digital television signal broadcast over an HD-MAC channel, in accordance with the present invention, finds a very advantageous application in the ground television broadcasting networks, wired networks or short-wave link relays, the pre-existing equipment such as the HD-MAC encoder, the band reduction encoder BRE and the HD-MAC band restitution decoder, BRD, being able to be used without modification, the narrow band encoding respectively decoding devices of the present invention being intended to play the role of an upstream respectively downstream interface circuit of the BRE encoder respectively of the BRD decoder.

The method and device for encoding-decoding a narrow band HD digital television signal, in accordance with the present invention, will be better understood from the following description with reference to the accompanying drawings in which, apart from FIGS. 1a and 1b which are relative to the prior art.

A more detailed description of the encoding-decoding method and device of the present invention will be given first of all with reference to FIGS. 2a and 2b.

Figure 2A:
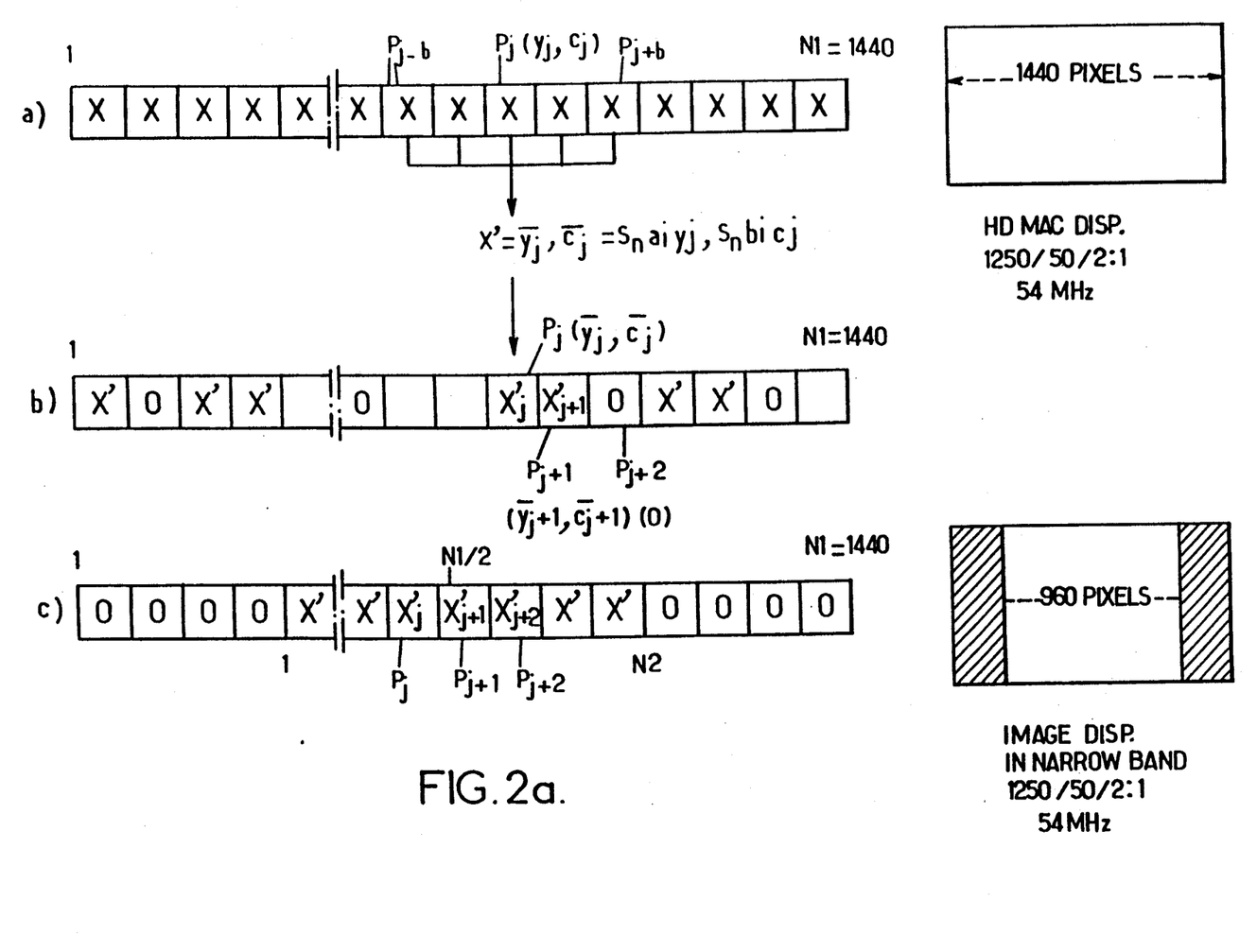
FIG. 2a shows an illustrative diagram relative to the use of the method of the invention in the case of encoding.

As is shown schematically in FIG. 2a, the method of the present invention consists in encoding the HD digital television signal upstream of the HD-MAC BRE encoder for narrow band broadcasting of said digital signal.

As can be seen in FIG. 2a, the encoding procedure consists in horizontal compression, by decimation, at the level of each line of the high definition images, so as to bring the number N1 of useful pixels per line of this image to a value N2=αN1 after compression The number of useful pixels is thus brought to the ratio of the sampling frequencies, α=f2/f1, where f2 represents the sampling frequency of the narrow band encoded signal In FIG. 2a, at point a therein, the video component values of the high definition television signal have been shown, these video components relative to each image point or pixel of a line of 1440 pixels being referenced X and showing conventionally the luminance and chrominance components.

As will be noted in FIG. 2a, the line decimation procedure consists in computing over N consecutive pixels of a line, these pixels being referenced pj−b to pj+b with b=n/2 or b=(n−2)/2, the mean weighted value referenced Yj, Cj of the luminance Yj and chrominance Cj components of the pixels considered. In FIG. 2a, the notation X' designates the pair of values Yj, Cy associated with each pixel pj of an image line considered.

In accordance with the object of the present invention, such as shown schematically in FIG. 2a, it then consists in attributing to two successive pixels, for example pj, pj+1, out of three for luminance Yj and chrominance Cj values respectively Yj+1, Cj+1 the mean values $\overline{Yj}$, $\overline{Cj}$ respectively $\overline{Yj+1}$, $\overline{Cj+1}$ of previously computed luminance and chrominance components. The luminance and chrominance component values of the third pixel pj+2 of the three successive pixels are then fixed at an arbitrary or dummy value, which is shown conventionally by the value zero at point b in FIG. 2a. It will of course be understood that the zero value is purely illustrative and that it may correspond to an arbitrary luminance and chrominance grey value for example.

Of course, the preceding operations are repeated for all the pixels pj of order j of the line considered for j included between $$\frac{n}{2} \leq j \leq N1 - \frac{n}{2} \qquad \text{if } n \text{ is even}$$

or $$(n-1)/2 \leq j \leq N1 - (n-1)/2 \quad \text{if } n \text{ is uneven.}$$

It will in particular be noted that for the pixels pj of order j respectively between 1 and n/2 and between N1-n/2 and N1, special processing may be carried out, this processing consisting simply in an extrapolation of the mean weighted values for said pixels pj of order j.

Following implementation of the step such as shown at point b in FIG. 2a, a succession of video component values is then available for the high definition image line which consists in two successive mean weighted values followed by an arbitrary inserted value.

The encoding method of the present invention then consists, as is shown in FIG. 2a at point c, in re-arranging the computed video component values, the non arbitrary values attributed to the luminance and chrominance component values, such re-arrangement being made with respect to the middle pixel of order N1/2. The arbitrary luminance and chrominance values X' of the decimated pixels are then re-arranged at the end of the corresponding line so as to form a line and finally an image of reduced useful format which is re-centred with respect to the middle pixel of order N1/2.

In FIG. 2a, the high definition image format has also been shown comprising 1250 lines each having 1440 pixels before encoding, then the image format which will be obtained from the narrow band encoded signal, this format corresponding to 960 useful pixels out of the 1440 pixels per line, the end pixels of each line being brought to the arbitrary value and finally to the above mentioned grey component value.

A more detailed description of an operating mode for implementing the encoding method of the present invention will be given with reference to FIG. 2b.

Figure 2B:
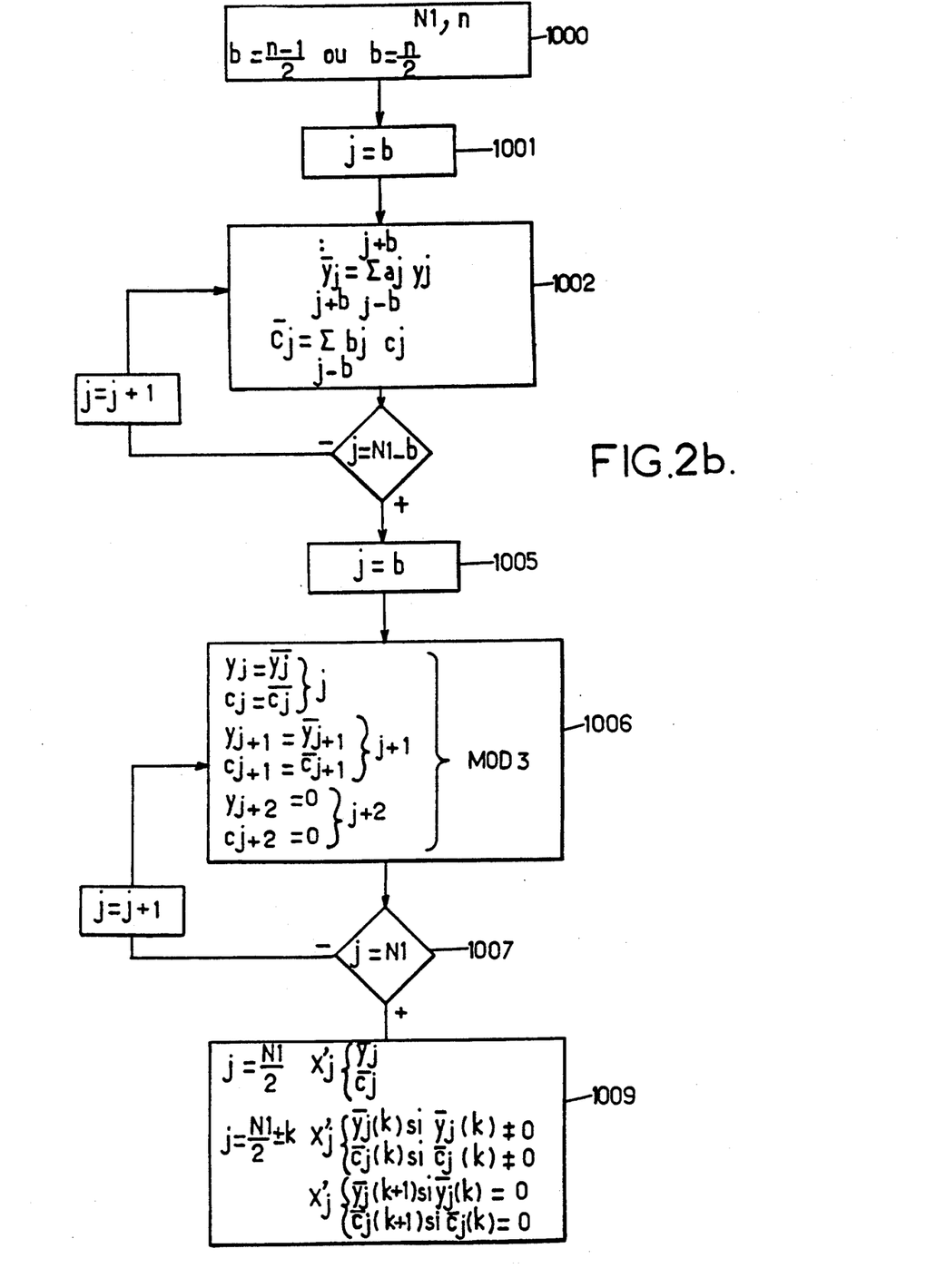
FIG. 2b is a flowchart of the steps for effective implementation of the method of the invention illustrated in FIG. 2.

Of course, processing of the luminance and chrominance component values is achieved using a computing programme, which may thus comprise, as is shown in FIG. 2b, the following essential steps: said computing programme comprises first of all a step for initialization of the N1 parameters, n and b as a function of the parity of n. The initialization steps 1000 and 1001 in FIG. 2b are then followed for the pixel pj considered by a step 1002 for computing the weighted means over the n pixels of the luminance Yi and chrominance Cj values. A test 1003 followed by an incrementation of the order j of the pixel pj considered 1004, allows the above computation to be carried out for the whole of the pixels pj of the image line considered.

Computation 1002 is carried out for the above set of pixels and for pixel pj of order N1−b, the weighted luminance and chrominance values are thus obtained.

A new initialization step 1005 followed by a sorting 1006 then allows, for two successive pixels of order j, j+1, the corresponding weighted luminance and chrominance values to be assigned, the arbitrary value zero being assigned to the mean weighted value of order j+2. A test on the value of the order j at 1007 with respect to the limit value N1 and incrementation of the order j at 1008 provides, for the whole of the pixels of the image line, insertion of the zero arbitrary value between two successive computed values, as is shown at point b in FIG. 2a.

Using a sorting program 1009 with respect to the middle pixel, of order N1/2, by comparison with the arbitrary value for example of the chrominance and luminance components, the non arbitrary computed values can be re-arranged so as to form the reduced format high definition image line, as is shown at point c in FIG. 2a.

It will be noted that the flowcharts of the program modules shown in FIG. 2b are given solely by way of example, the construction of the corresponding programs not being described for it is within the scope of a man skilled in the art.

A more detailed description of the method of the invention used in the case of decoding the narrow band encoded HD digital television signal, as described above in relation to FIGS. 2a and 2b, will now be given with reference to FIG. 3.

Of course, the decoding procedure may be used at the level of reception of the HD-MAC NB signal downstream of the decoder BRD.

The decoding procedure typically comprises, on reception of the narrow band encoded signal, a horizontal image decompression step.

It can therefore be implemented by means of horizontal-decompression of lines and images of the narrow band encoded signal, so as to bring the number N2 of effective pixels per line of the high definition image to the initial value N1.

Figure 3:
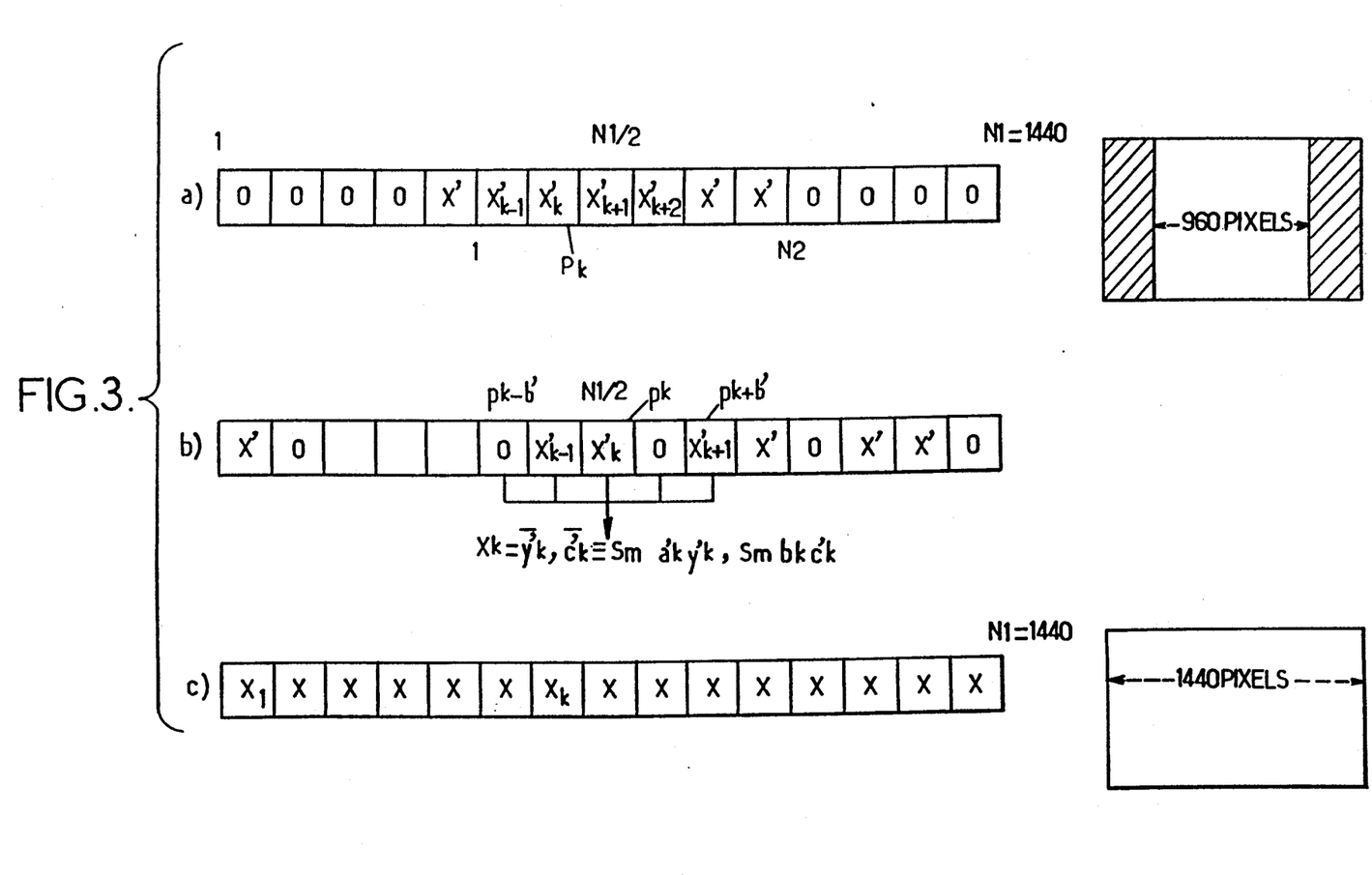
FIG. 3 is an illustrative diagram relative to the implementation of the method of the invention in the case of decoding.

As is shown in FIG. 3, the pixels, in particular the luminance and chrominance component values X'k for the pixel pk considered, correspond for each image line to the pixels obtained after encoding as is shown at point c in FIG. 2a. Of course, the format of the image received thus corresponds to the format of the image obtained after encoding.

As is shown in FIG. 3, the decoding procedure then consists in inserting, at the level of each image line, an arbitrary luminance respectively chrominance component value, the value referenced zero at point b in FIG. 3, on one pixel out of three successive ones referenced pk−1, pk, pk+1. It will be readily understood that the insertion of the arbitrary values, as in the encoding procedure, corresponds to the insertion of a luminance value and a chrominance value corresponding to a grey value, such insertion being simply achieved by addressing the corresponding grey value between two successive non zero chrominance and luminance values.

The decoding procedure of the invention such as is shown in FIG. 3 then consists in interpolating the arbitrary values by weighted summation over m successive pixels for the current pixel pk considered. In FIG. 3, the notation Xk designates the corresponding pair of values of the mean weighted luminance $\overline{Y'k}$ and chrominance $\overline{C'k}$ values, these mean values being obtained by a weighted sum of the chrominance respectively luminance values and of the arbitrary inserted values.

Of course, the preceding operations are repeated for all the image pixels pk f order k of each image line for k verifying the values:

$$\frac{m}{2} < k < N1 - \frac{m}{2} \qquad \text{if } n \text{ is even}$$

or $$\frac{(m-1)}{2} < k < N1 - \frac{(m-1)}{2} \quad \text{if } n \text{ is uneven}$$

The decoding procedure of the present invention then consists in assigning the luminance Y'k and chrominance C'k component values, referenced Xk, to the pixel pk of the line considered so as to re-constitute, after application of the preceding steps to each image line, a re-constituted image to the high definition format.

Of course, it will be understood that for effectively implementing the decoding procedure as is shown schematically in FIG. 3, it is possible to use the corresponding computing module used for implementing the encoding procedure and previously described in relation to FIG. 2b.

A more detailed description of an encoding device for implementing the encoding procedure in accordance with the present invention will now be given in relation to FIGS. 4 and 5.

Figure 4:
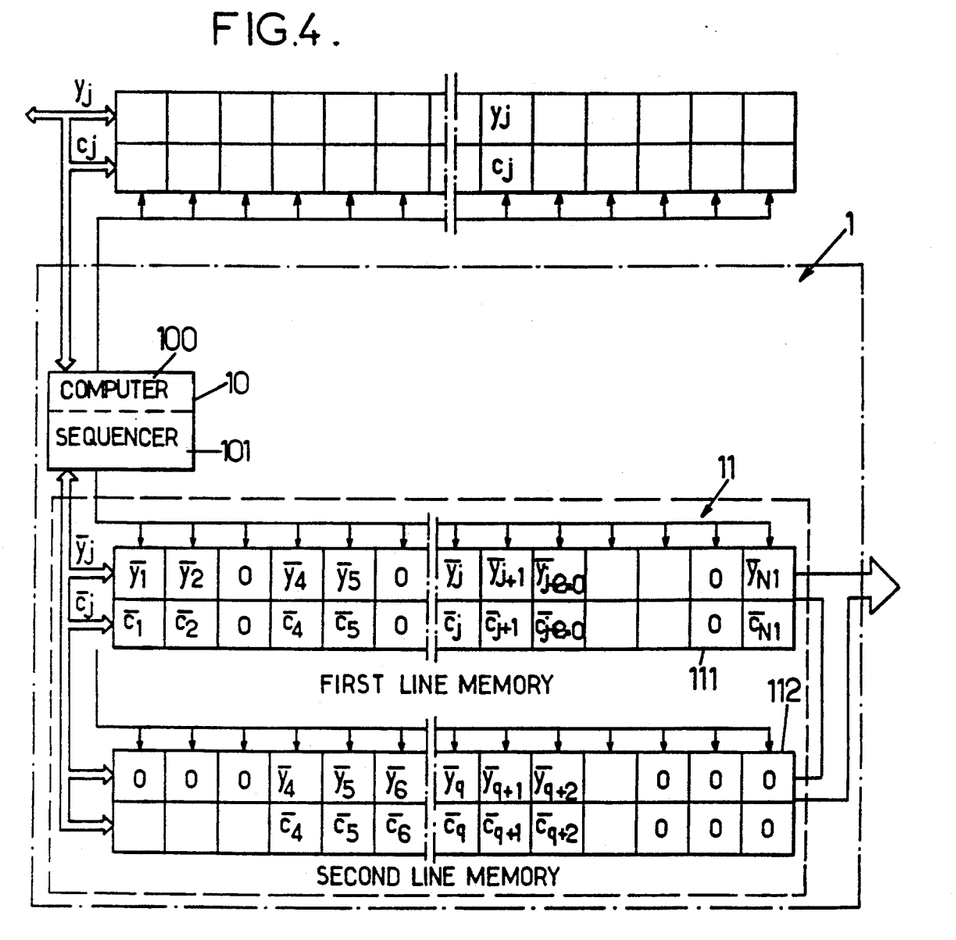
FIG. 4 is an illustrative diagram of an encoding device for implementing the encoding method of the invention.

In accordance with FIG. 4, the encoding device comprises a circuit 1 for horizontal compression by decimation of the high definition images, the number N1 of useful pixels per line of the high definition image being brought to a value N2 after compression in the ratio of the sampling frequencies.

As is shown in FIG. 4, the compression circuit 1 comprises a computer 10 computing, over n consecutive pixels of the high definition image lines stored, the mean weighted value of the luminance Yj and chrominance Cj components of these mean weighted values of these points for all the pixels pj of order j, as defined above for implementing the encoding procedure The compression circuit 1 further comprises a circuit 11 for storing and arranging the mean weighted values Yj, Cj, one of the mean values Yj, Cj out of three consecutive mean values being fixed at a fixed arbitrary or dummy value, these arbitrary values being re-arranged at the end of the storage circuit so as to form a reduced format high definition image line.

Figure 5:
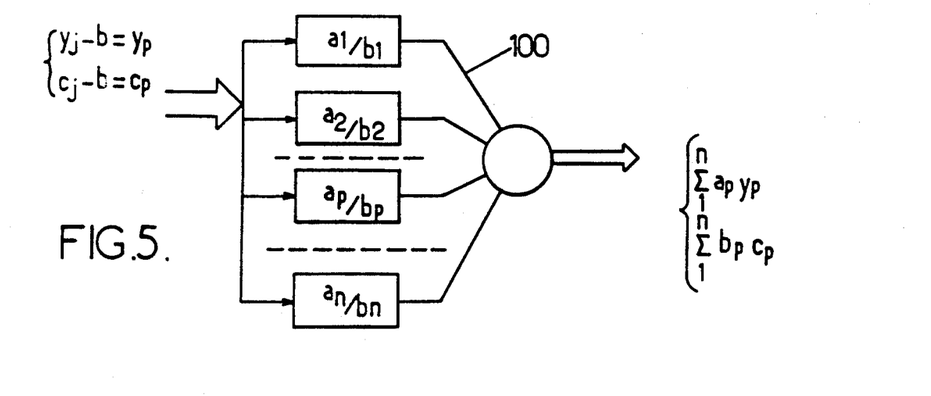
FIG. 5 shows an illustrative diagram relative to an advantageous embodiment of the computer shown in FIG. 4.

By way of non limitative example, as is shown in FIG. 5, computer 10 may comprise a circuit 100 of digital filter type comprising n attenuation elements referenced a1, a2, ap, an or b1, b2, bp, bn and a summation operator The summation operator delivers the mean weighted value of the n values present at the input of each of the attenuation elements. Such a computing circuit will not be described in detail, for such a circuit is normally available commercially under the trade name MULAC, this type of circuit being manufactured by the CNS, Centre Norbert Segard at Grenoble, France, and commercialized in particular by the firm Matra Harris Semi-Conducteurs.

In an advantageous embodiment of the encoding device such as is shown in FIG. 4, circuit 11 for storing the mean weighted values may advantageously comprise a first line memory referenced 111 and a second line memory referenced 112 connected in parallel, the first and second line memories being connected for writing/reading at the output of the computing circuit 100, such as is shown in FIG. 5.

Furthermore, with computer 10 and the computing circuit 100 is associated a sequencer circuit 101 for alternate read/write control of the first and second line memories.

The operation of the encoding device of the invention such as is shown in FIG. 4 is then as follows.

From an auxiliary memory A, which may or may not be incorporated in the encoding device such as shown in FIG. 4, this auxiliary memory in fact playing the role of a buffer memory for the chrominance and luminance components of the pixels of a line of the high definition signal previous to narrow band encoding thereof, the computing circuit 10 serving first of all for writing into the first line memory 111 the mean weighted luminance and chrominance values computed from the luminance and chrominance component values of the corresponding line image stored in the auxiliary memory A, the n values over which the weighting relates being called up by the sequencer 100 and assigned to the input of the attenuation elements a1 to an, b1 to bn, of the computing circuit 100, which delivers the corresponding mean weighted values.

The mean luminance and chrominance values having thus been obtained and written into the first line memory, the computer 10 calls up the sorting program for inserting the arbitrary values referenced zero in FIG. 4 between two successive mean weighted value luminance respectively chrominance values. The computer 10 calls up the re-arrangement program with respect to the pixel of order N1/2, as described in connection with the encoding method of the invention, for causing said re-arrangement and writing into the second line memory the re-arranged values as is shown in FIG. 4. The sequencer 101 then causes transmission of the reduced format image line stored in the second line memory, corresponding to the narrow band encoded signal, instead of the initial chrominance and luminance component values of the original digital signal.

Of course, it will be understood that for the transmission frame of the next original digital signal, the role of the first and second line memories is reversed.

It will be further noted that the presence of the auxiliary memory A is not indispensable provided that computer 10 and sequencer 101 are capable of providing the corresponding processing during the transmission frame. In this case, the buffer memory function of the auxiliary memory A may be transferred for example to the second line memory which is thus used at the beginning of the processing procedure to play the role of buffer memory.

For decoding the narrow band encoded signal broadcast over an HD-MAC type channel in HD-MAC NB broadcasting, it is necessary to provide a corresponding decoding device, this device comprising at least a system for restoring the image format by horizontal decompression of the image line.

Figure 6:
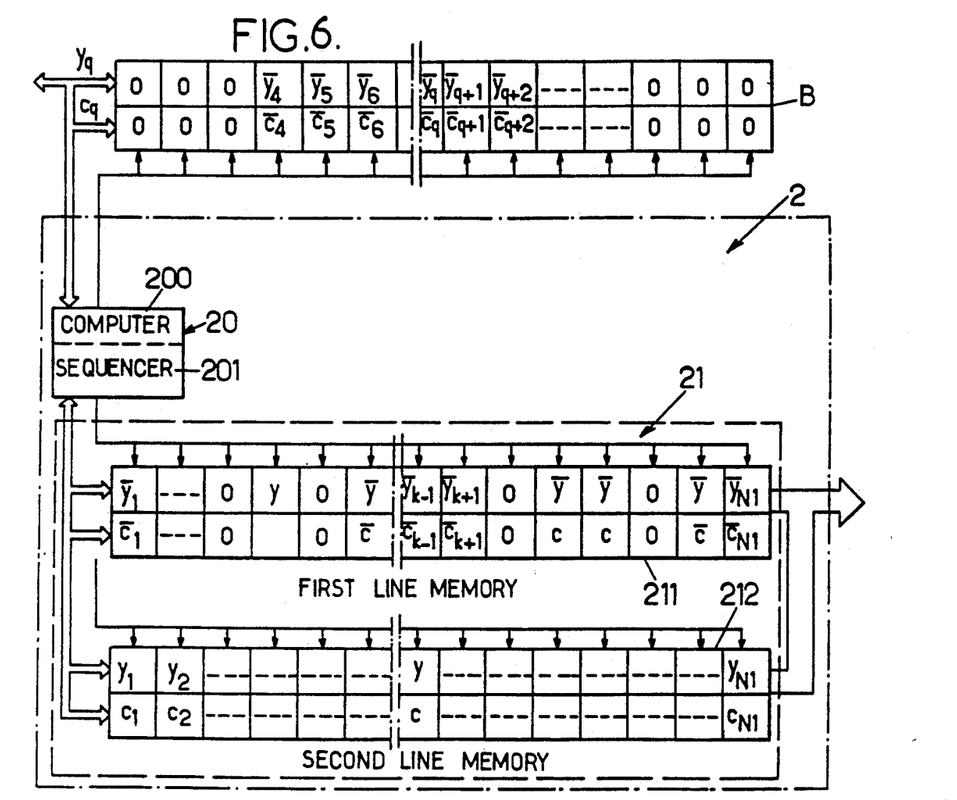
FIG. 6 shows, similarly to FIG. 4, an illustrative diagram of a decoding device for implementing the decoding method of the present invention.

In FIG. 6, a decoding device has been shown which provides decoding of the narrow band encoded signal by means of dual operations of the encoding operations.

Similarly to the encoding device such as shown in FIG. 4, the decoding device 2 may comprise a circuit 21 for storing lines of the coded luminance and chrominance components of the pixels pk of an image line considered and a write/read computer 20 of the line storage circuit 21, this write/read circuit allowing the insertion at the level of each image line of an arbitrary value of luminance respectively chrominance components on one pixel out of three successive ones pk−1, pk, pk+1.

Furthermore, a computing circuit 200 is provided for interpolating the arbitrary values of the luminance and chrominance components for establishing a value of the luminance respectively chrominance components for a pixel pk considered.

Of course, an auxiliary line memory B may be provided under conditions similar to those of the encoding device of FIG. 4, which memory, as buffer memory, receives the narrow band encoded luminance and chrominance components.

As is shown in FIG. 6, the storage circuit 21 comprises similarly to the encoding circuit shown in FIG. 4, a first 211 and a second 212 line memory, which memories are connected in parallel The first and second line memories are connected for writing/reading at the output of the computing circuit 200. Similarly, a read/write sequencer circuit 201 of the first and second line memories is provided for controlling the first and second line memories alternately for writing and reading.

The operation of the decoding device such as is shown in FIG. 6 is similar to the operation of the encoding device as is shown in FIG. 4, the operations being the dual operations.

It will be noted in particular that the write/read computer 20 comprises a computing circuit 200 of a type similar to that shown in FIG. 5 relatively to the encoding device. However, the computing circuit 100 used in the encoding device comprises, both for the chrominance and luminance component values, 47 coefficients of given value, these coefficients consisting of positive or negative real value coefficients, the parameter n being equal to 47, whereas the corresponding computing circuit 200 of the decoding device may if required be limited to 9 attenuation coefficients for the chrominance and luminance component values, the parameter m then being equal to 9.

A table of the values of the coefficients ai, bi, in the case where 47 coefficients are used, not only for the encoding device but also for the decoding device is appended to the present description, in the case of a computing circuit 200 forming a two phase, respectively three phase, filter, these coefficients being symmetrical with respect to the central coefficient of rank 24.

The operation of the decoding device such as shown in FIG. 6 is as follows.

For the narrow band and reduced format luminance and chrominance component values stored in the buffer memory B, the computer 20 calls up the sorting program for inserting the arbitrary values between two successive luminance respectively chrominance values in the first image line for example. The computer 20 calls up the programme for computing the mean weighted luminance and chrominance values for reading m successive values stored in the first line memory and assigns these values to the computing circuit 200, which delivers the corresponding mean weighted values. These mean weighted values for each pixel pk of the corresponding image line are then written into the second line memory at the address k of the corresponding pixel pk. The sequencer 201 then ensures transmission of the set of luminance and chrominance values, thus re-constituted by interpolation and written in the second line memory 212. Of course, during the transmission frame of the following digital data of the high definition digital image, the role of the first and second line memories is reversed.

It will be understood similarly that the use of a sequencer and a high speed computer 20 allows the buffer memory B to be omitted, the buffer memory role then being taken over by the second line memory for example.

A description of the general architecture of a complete device, forming in fact an HD-MAC NB channel in accordance with the present invention, will be given with reference to FIG. 7.

In said figure, the main elements of an HD-MAC NB type channel have been shown schematically, in particular the band reduction encoder BRE and the band restitution decoder BRD. Furthermore, it will be understood that the encoding device 1 and decoding device 2 such as described in connection with FIGS. 4 and 6 are interconnected by interfaces upstream of the band reduction encoder BRE respectively downstream of the band restitution decoder BRD, the encoding device 1 and decoding device 2 according to the present invention being simply shown by their corresponding functional block.

In so far as the operation of a band reduction encoder of HD-MAC type fed with the narrow band encoded signals such as described above is concerned, it should be noted that certain modules of the band reduction encoder BRE must be modified. In particular, the size of the decision blocks normally comprising 16×16 pixels (horizontal×vertical) must be brought to 12×16 so as to keep a certain horizontal size after horizontal extension in the ratio 3/2 by the final conversion carried out downstream of the band restitution decoder by decoder 2 of the present invention, the sampling frequency of value f2 equal to 36 MHz being brought back to the initial frequency f1 at 54 MHz.

Similarly, in so far as encoding the TV assistance data is concerned, this assistance data being relative to the information of the decision fields and movement vectors, it must be modified so as to comply with the new constraint of assistance data flow., this useful flow, equal to 1.1 Mbits per second within the scope of the initial HD-MAC channel, having to be brought back to 0.7 Mbits per second, i.e. in the ratio of the sampling frequencies f2 to f1 as mentioned above.

It will be understood that the reduction of the assistance data flow, this assistance data being normally coded in duo-binary code for example, may be obtained by reducing the number of pixels forming the decision blocks in the HD-MAC transmission protocol or by using a new movement estimator for example. For a detailed description of such a movement estimator, reference may be made to the French patent application entitled "Estimateur de mouvement pour images de television numeriques diffusees sur canal HD-MAC en bande etroite" filed under the application number 90 03549 in the name of the Applicant on the same day as the present application. It will be recalled that the TV assistance data referenced DATV is obtained in the HD-MAC encoder from image data divided into small blocks, a few tens of thousands per image, on which space-time activity measurements of these images are made homogeneously. This activity measurement per block is transmitted to the HD-MAC decoder by the above TV assistance data, the HD-MAC encoder remotely controlling decoding as a function of the TV assistance data.

It will be noted that the sub-sampling filtering units of a band reduction encoder BRE operating from a narrow band encoded signal in accordance with the present invention, for broadcasting over an HD-MAC NB type channel, are identical to those of a band reduction encoder of an HD-MAC type channel to the extent that these units operate at the level of the pixels.

In so far as the modules working at the level of the blocks are concerned, decision block, decision and movement estimation block and block for encoding the TV assistance data, they must be slightly modified so as to take into account particularly the reduction of the bit rate of the assistance data as mentioned above.

Figure 7:
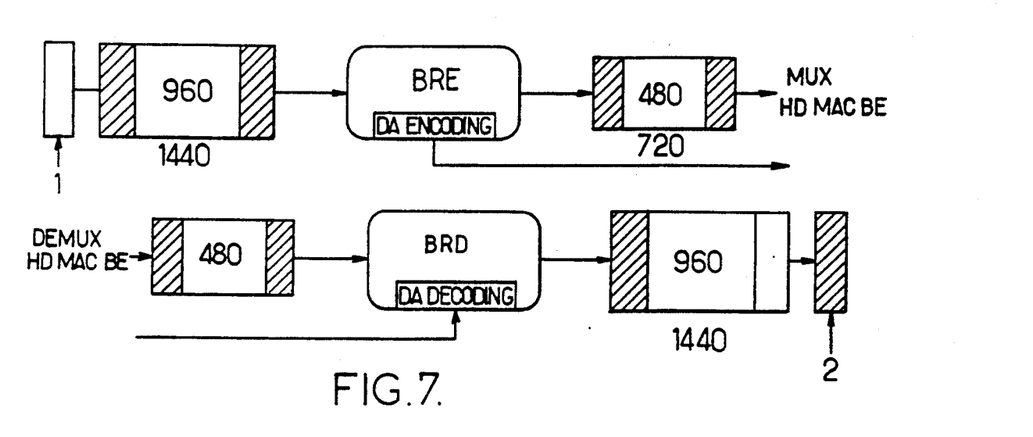
FIG. 7 shows purely by way of example the general architecture of a channel for broadcasting a narrow band encoded digital television signal, called HD-MAC NB type, in accordance with the present invention.

It will thus be noted, as shown schematically in FIG. 7, that the output of the band reduction encoder BRE operating with narrow band, for it is fed by a source delivering a narrow band encoded digital signal via the encoding device 1 of the present invention, also has grey edges with a useful part centered on the image, this useful part occupying 480 pixels out of 720, the whole over 576 useful lines per image. The signal delivered by the band reduction encoder operating with narrow band may then be delivered to the HD-MAC multiplexer such as described in the French patent application 89 12410 in the name of the Applicant. It will however be noted that the signal delivered by the band reduction encoder BRE can be directly recorded on a digital video recorder to the standard 4 2 2.

In so far as the band restitution decoder BRD is concerned, the above HD-MAC NB signal corresponding to a signal of format 4 2 2 with 720 pixels per line and 288 lines per frame, it may directly drive a band restitution decoder or HD-MAC BRD.

In fact, taking into account the reduction of the transmission rate of the TV assistance data DATV, only the decoding card of this data must be modified. It is then sufficient to carry out the modification, taking into account for example the number of pixels per block previously mentioned in the description. All the other modules operate normally without any modification for they are based on operation at the level of each pixel or on elementary blocks of 4×4 pixels, which is compatible with blocks of 12 pixels wide as was mentioned above.

As is shown in FIG. 7, it is only then necessary to add a digital decompression unit downstream of the HD-MAC NB band restitution decoder BRD for restoring a full screen signal.

Said decompression may then be implemented by means of the decoding device 2 of the present invention such as described above or, if required, with the decoding device 2 not inserted, by sampling at the frequency f2, namely at 36 MHz. In this latter case, the digital signal delivered by the band restitution decoder BRD operating in a narrow band may simply be transmitted to a D/A converter operating at said frequency f2, namely at 36 MHz, for restoring the corresponding video components.

Thus a method and device have been described for encoding-decoding a high definition digital television signal into a narrow band encoded signal for broadcasting the encoded signal over an HD-MAC type channel for narrow band HD-MAC type broadcasting.

The encoding-decoding method and device of the present invention appear particularly advantageous to the extent that they not only provide compatibility with the image production standards defined by the CCIR as already mentioned but also compatibility such as defined previously with the original HD-MAC channel equipment.

It will be further noted, as has been already mentioned, that the narrow band reduced format encoded digital signal such as delivered by the band reduction encoder HD-MAC BRE can be recorded on a digital video recorder.

APPENDIX

| Coefficient rank | | Coefficient value |
|---|---|---|
| Two-phase filter—encoding device | | |
| Central coefficient | 24 | 892 |
| 23 | 25 | 636 |
| 22 | 26 | 128 |
| 21 | 27 | −172 |
| 20 | 28 | −112 |
| 19 | 29 | 62 |

APPENDIX-continued

| Coefficient rank | | Coefficient value |
|---|---|---|
| 18 | 30 | 89 |
| 17 | 31 | −10 |
| 16 | 32 | −64 |
| 15 | 33 | −14 |
| 14 | 34 | 40 |
| 13 | 35 | 23 |
| 12 | 36 | −20 |
| 11 | 37 | −23 |
| 10 | 38 | 6 |
| 9 | 39 | 17 |
| 8 | 40 | 2 |
| 7 | 41 | −11 |
| 6 | 42 | −4 |
| 5 | 43 | 5 |
| 4 | 44 | 5 |
| 3 | 45 | −2 |
| 2 | 46 | −4 |
| 1 | 47 | 1 |
| Three-phase filter—encoding device | | |
| Central coefficient | 24 | 1338 |
| 23 | 25 | 954 |
| 22 | 26 | 191 |
| 21 | 27 | −258 |
| 20 | 28 | 168 |
| 19 | 29 | 94 |
| 18 | 30 | 134 |
| 17 | 31 | −17 |
| 16 | 32 | −96 |
| 15 | 33 | −20 |
| 14 | 34 | 60 |
| 13 | 35 | 35 |
| 12 | 36 | −30 |
| 11 | 37 | −34 |
| 10 | 38 | 9 |
| 9 | 39 | 26 |
| 8 | 40 | 3 |
| 7 | 41 | −16 |
| 6 | 42 | −7 |
| 5 | 43 | 8 |
| 4 | 44 | 7 |
| 3 | 45 | −2 |
| 2 | 46 | −6 |
| 1 | 47 | 0 |

I claim:
1. A method of encoding a high definition digital television signal into a narrow band encoded signal so as to enable broadcasting of said high definition digital television signal over an HD-MAC type channel said high definition digital televison signal having N1 useful pixels per image line and being representative of high definition images samples at a sampling frequency f1 and said encoded signal corresponding to a narrow band signal sampled at a sampling frequency f2 so as to enable broadcasting of said encoded signal in HD-MAC NB narrow band, wherein f2 is less than f1, and wherein said method further comprises providing horizontal compression of said high definition images by substituted of one pixel of a subset of pixels of the image lines of said high definition images with a dummy pixel of arbitrary value so that the subset contains non-dummy and dummy pixels and repeating said substitution for all subsets of the image lines, so as to bring the number N1 of useful pixels per line of the high definition image to a number N2 of non-dummy pixels, wherein N2=αN1, after said horizontal compression, to thereby produce a narrow band encoded signal representative of an image line and reduced format high definition images, wherein α is the ration of the sampling frequencies f2/f1, the horizontal compression step comprising:
   (a) computing for each said subset of n consecutive pixels of each line of said high definition image the mean weighted value of luminance and chrominance components of the pixels of that subset, (b) attributing said means weighted values to the luminance and chrominance values of the non-dummy pixels of said subset of pixels, (c) repeating the preceding steps (a) and (b) for all the subsets of pixels of said image lines, (d) rearranging said dummy pixels and non-dummy pixels which have been attributed said mean weighted values such that said dummy pixels of arbitrary value are arranged at the beginning and the end of the corresponding line so as to form a reduced format image and thereby reduce bandwidth of said encoded high definition digital television signal to a narrow band encoded signal.

2. A method according to claim 1, wherein the computing step comprises computing, over n consecutive pixels pj−b to pj+b with n−n/2 or b=(n−1)/2 of each line of the high definition image, the mean weighted value $\overline{Y_j}$, $\overline{C_j}$ of the luminance Yj and chrominance Cj components of said pixels, the attributing step comprises attributing to two successive pixels pj, pj+1 out of three, for the luminance Yj and chrominance Cj values respectively Yj+1, Cj+1, the mean values $\overline{Y_j}$, $\overline{C_j}$ respectively $\overline{Y_{j+1}}$, $\overline{C_{j+1}}$ of luminance and chrominance components, the values of the luminance and chrominance components of the third pixel pj+2 being fixed at an arbitrary value, the repeating step comprises repeating operations a) and b) for all the pixels pj of order j of each image line so that $$\frac{n}{2} < J < N1 - \frac{n}{2} \quad \text{if } n \text{ is even}$$

or $$(n-1)/2 < j < N1 - (n-1)/2 \quad \text{if } n \text{ is uneven, and}$$

the rearranging step comprises rearranging the non-arbitrary computed values attributed to the luminance and chrominance component values with respect to the middle pixel of order N1/2, the arbitrary luminance and chrominance values of the decimated pixels being rearranged at the end of the corresponding line so as to form a reduced format image re-centered with respect to the middle pixel of order N1/2.

3. A method according to claim 2, wherein said method further comprises carrying out horizontal line and image decompression of the narrow band encoded signal, so as to bring the number of value N2 of effective pixels per image line of the high definition image to the value N1, said method comprising the steps comprising:

a) inserting at the level of each image line arbitrary luminance and chrominance component values on one pixel out of three successive ones pk−1, pk, pk+1, b) interpolating said arbitrary values by mean weighed summation over m successive pixels of the luminance and chrominance values so as to establish a luminance value Yk and chrominance value Ck for the corresponding pixel pk, c) repeating operations a) and b) for all the pixels pk of order k of each image line so that:

$$\frac{m}{2} < k < N1 - \frac{m}{2} \quad \text{if } m \text{ is even}$$

or $$\frac{(m-1)}{2} < k < N1 - \frac{(m-1)}{2} \quad \text{if } m \text{ is uneven}$$

d) assigning the luminance component values Yk and chrominance component values Ck to the pixels pk of the corresponding image line so as to reconstitute, after application of the preceding steps a) to c) to each image line, an image with re-constituted high definition format.

4. A method of decoding a high definition digital television signal coded into a narrow band encoded signal according to the method of claim 1, wherein said method comprises, on reception of the signal through a HD-MAC decoder, providing a horizontal image decompression.

5. A method according to claim 4, wherein said image decompression step comprises, on reception of the encoded signal, effecting at the output of said HD-MAC decoder format expansion by frequency changing so as to obtain an image to the improved image factor.

6. A system for encoding a high definition digital television signal into a narrow band encoded signal for broadcasting over an HD-MAC type channel, said digital television signal having N1 useful pixels per image line, said image line being stored in image line storage means and being representative or high definition images sampled at a sampling frequency f1, and the encoded signal corresponding to a signal sampled at a sampling frequency f2 so as to enable broadcasting of the encoded signal in HD-MAC NB narrow band, wherein f2 is less than f1 and wherein said system further comprises image compression means for providing horizontal compression of said high definition images, by substitution of one pixel of a subset of pixels of an image line of said high definition images with a dummy pixel of arbitrary value so that the subset contains dummy and non-dummy pixels, and repeating this substitution for all subsets of the image lines so as to bring the number N1 of useful pixels per image line of the high definition image to a number of non-dummy pixels, wherein N2=αN1, after compression, to thereby produce a narrow band encoded signal representative of an image line and reduced format high definition images, wherein α is the ratio of the sampling frequencies f2/f1, said image compression means comprising computing means for computing for consecutive pixels of each subset of each line of said high definition image, the mean weighted values of luminance and chrominance components of said consecutive pixels and for attributing said weighted values of luminance and chrominance to the non-dummy pixels of the corresponding subset; and memory means for storing and rearranging the dummy and non-dummy pixels of each line such that the dummy pixels are arranged at the beginning and end of the corresponding line so as to form a reduced format high definition image and thereby reduce the bandwidth of said encoded high definition digital television signal to a narrow band encoded signal.

7. A system according to claim 6, wherein said computing means comprises means for computing, over n consecutive pixels pj to pj+n of the high definition image line stored, the mean weighted value of the luminance Yj and chrominance Cj components of said pixels, for all the pixels pj of order j such that:

$$\frac{n}{2} < j < N1 \frac{n}{2} \quad \text{if } n \text{ is even}$$

and said storing and rearranging means comprises means for storing and rearranging said mean weighted values $\overline{Yj}$, $\overline{Cj}$, one of said mean weighted values $\overline{Yj}$, $\overline{Cj}$ out of three consecutive means weighted value $\overline{Yj}$, $\overline{Cj}$, $\overline{Yj+1}$, $\overline{Cj+1}$, $\overline{Yj+2}$, $\overline{Cj+2}$ being fixed at a fixed arbitrary value, said arbitrary values, for re-sequencing, being rearranged at the end of the image line storage means s as to form a reduced format high definition image line.

8. A system according to claim 7, wherein said means for storing the mean weighted values comprise:
 a first image line memory and a second image line memory connected in parallel, the first and second image line memories being connected for writing/reading at the output of said computing means; and
 means for alternate reading/writing control of said first and second line memories.

* * * * *